United States Patent [19]

Tabacchi

[11] Patent Number: 4,494,834
[45] Date of Patent: Jan. 22, 1985

[54] HINGE FOR THE PIVOTING OF AN ELASTICALLY DIVERTIBLE TEMPLE PIECE TO AN EYEGLASS FRAME

[75] Inventor: Vittorio Tabacchi, Padua, Italy

[73] Assignee: Safilo, S.p.A., Padua, Italy

[21] Appl. No.: 378,856

[22] Filed: May 17, 1982

[51] Int. Cl.³ .......................... G02C 5/16; G02C 5/22
[52] U.S. Cl. ..................................... 351/153; 351/113; 16/228
[58] Field of Search ....................... 351/121, 153, 113; 16/228

[56] References Cited

U.S. PATENT DOCUMENTS

| | | | |
|---|---|---|---|
| 3,644,023 | 2/1972 | Villani | 16/228 X |
| 4,005,930 | 2/1977 | Guenin | 351/153 X |
| 4,351,086 | 9/1982 | Drlik | 16/228 |

Primary Examiner—Rodney B. Bovernick
Attorney, Agent, or Firm—Howard I. Schuldenfrei

[57] ABSTRACT

The invention is for an improved hinge for pivotably connecting an eyeglass temple piece to an eyeglass frame, which permits a stable positioning of the temple piece in a folded or closed position in order to conveniently store the eyeglasses and a stable positioning of the temple piece into a normal open position for wearer use of the frame and which permits still further elastic movement of the temple piece beyond the normal open position without damage to the frames or hinge. The improved hinge includes a rod-shaped slide which is slideably mounted in a seat provided in the end portion of the temple piece and which protrudes from the seat. A hole is formed in the slide which extends coaxially in the slide over a predetermined depth from its protruding end. A slot is formed in the slide which extends longitudinally in the slide over a predetermined length from its protruding end. The predetermined length of the slot is less than the depth of the hole in the slide and the slot debouches in that hole. A block is fastened transversely at the mouth of the seat, extends through the slot and constitutes an axial guide for the slide. A spring is mounted in the hole in the slide having an end in pressing contact with the block and another end in pressing contact with the bottom wall defining the hole.

8 Claims, 5 Drawing Figures

HINGE FOR THE PIVOTING OF AN ELASTICALLY DIVERTIBLE TEMPLE PIECE TO AN EYEGLASS FRAME

BACKGROUND OF THE INVENTION

The present invention relates to a hinge for pivoting an eyeglass temple piece to an eyeglass frame, such hinge permitting a stable positioning of the temple piece in a folded position in order to put away the eyeglasses and into an open position in order to place them on, as well as further elastic movement apart beyond the open position.

The known hinges of the above-indicated type which are at present in use have certain well-known disadvantages of a structural and functional nature.

As a matter of fact, due to the large number of mechanical parts of which the prior art hinges are formed, they require, upon their manufacture, lengthy and costly operations, both for their machinery and their assembly. From a functional standpoint, the known hinges are subject to wear, which results in a progressive loss of the initial advantages in handling which distinguish eyeglasses provided with such hinges.

The object of the present invention is to provide a hinge of the above-indicated type which has structural and functional characteristics of such a nature as to overcome the drawbacks mentioned above with reference to the prior art.

SUMMARY OF THE INVENTION

Generally speaking, in accordance with the present invention, there is provided an improved hinge for pivotably connecting the temple piece to the eyeglass frame which includes a rod-shaped slide which is slideably mounted in a seat provided in the end portion of the temple piece and which protrudes from the seat. A hole is formed in the slide which extends coaxially in the slide over a predetermined depth from its protruding end. A slot is formed in the slide which extends longitudinally in the slide over a predetermined length from its protruding end. The predetermined length of the slot is less than the depth of the hole in the slide and the slot debouches in that hole. A block is fastened transversely at the mouth of the seat, extends through the slot and constitutes an axial guide for the slide. A spring is mounted in the hole in the slide having an end in pressing contact with the block and another end in pressing contact with the bottom wall defining the hole.

Still other objects and advantages of the invention will in part be obvious and will in part become apparent from the specification.

The invention accordingly comprises the features of construction, combinations of elements, and arrangement of parts which will be exemplified in the constructions hereinafter set forth, and the scope of the invention will be indicated in the claims.

BRIEF DESCRIPTION OF THE DRAWINGS

For a fuller understanding of the invention, reference is had to the following description taken in connection with the accompanying drawings, in which.

DETAILED DESCRIPTION OF THE INVENTION

Figure 1:
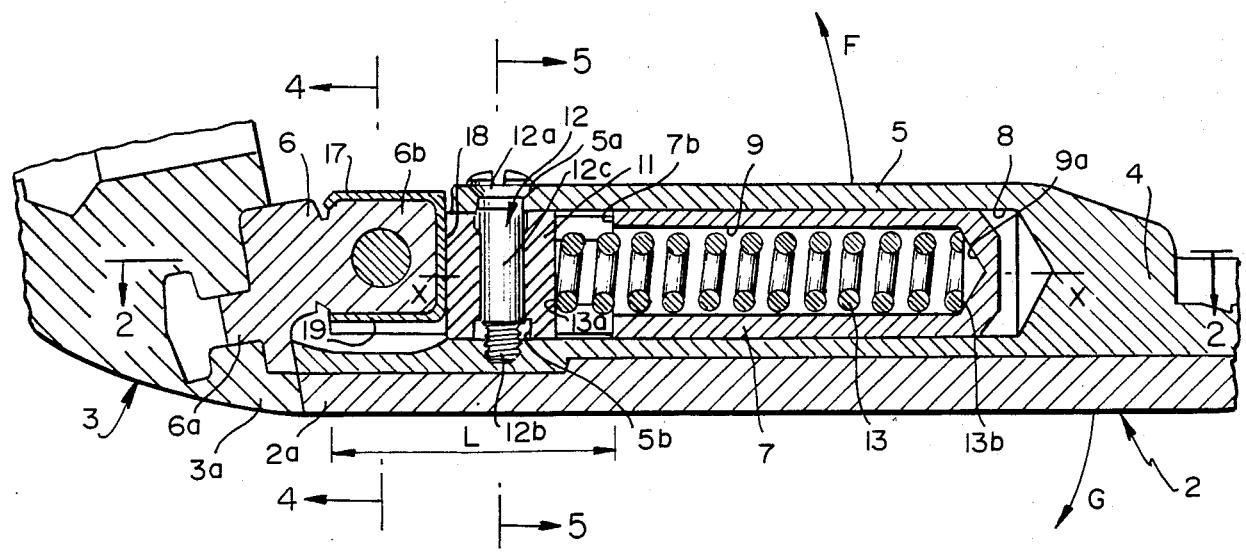
FIG. 1 is a plan view in section of a hinge in accordance with the invention, with the temple piece in open position.

Referring to the accompanying figures, 1 generally indicates a hinge for the pivoting of a temple piece 2 to a front piece 3 of an eyeglass frame. In the example shown, the temple piece 2 and the front piece 3 are of the type consisting of plastic; however, the hinge of the invention is also adapted to connect metal temple pieces and front pieces.

The temple piece 2 is provided with a reinforcing metal plate 4 which, at the end section of the temple piece, has a portion 5 of increased cross section.

The front piece 3 has a hinge support 6 with a portion 6a which is embedded in the plastic material and a portion 6b which protrudes from it.

Figure 5:
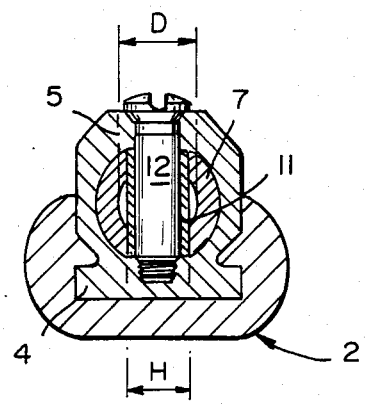
FIG. 5 is a sectional view through the hinge of FIG. 1 taken along the line 5—5.

The hinge 1 comprises a slide in the form of a cylindrical rod of circular cross section 7 which is mounted in a corresponding cylindrical seat 8 of axis X—X having a circular section, recessed in the portion 5 of the metal reinforcing plate 4 and partially protruding from said seat 8, as seen in FIG. 1, and FIG. 5.

Figure 2:
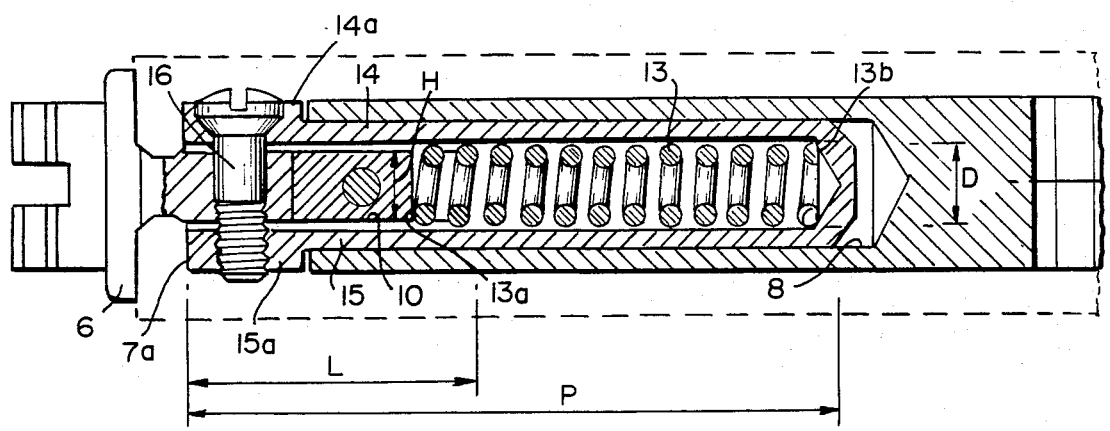
FIG. 2 is a cross sectional view of the hinge of FIG. 1 taken along the line of 2—2.

The slide 7 is coaxially provided with a hole 9 which has a predetermined diameter D and a predetermined depth P from the protruding end 6a of the slide 7, as seen in FIG. 2.

In said slide 7 there extends longitudinally a slot 10 which has a predetermined length from the end 7a, indicated by L, which is less than the said depth P. The slot 10 defines a shoulder 7b in the slide 7 and debouches on said hole 9; in the example shown the slot 10 has a width H which is slightly less than the diameter D of the hole 9.

The hinge 1 comprises a block 11 which is fixed transversely to the axis X—X at the mouth 8a of the seat 8. The block 11 is fastened to the portion 5 by a screw 12 which has a flared head 12a and an opposite pin end 12b in reference engagement with a corresponding flared seat 5a and a corresponding pin seat 5b provided in the portion 5, respectively, as well as a central portion 12c passing through the block 11 and connected by thread with it. The block 11 extends through the slot 10 and constitutes an axial guide for the slide 7.

A cylindrical spring 13, of an outside diameter slightly less than D, is mounted in guided fashion in the hole 9 and has ends 13a and 13b in pressing contact with the block 11 and the bottom wall 9a of the hole 9, respectively.

The slot 10 defines within the slide 7 a fork-shaped portion with prongs 14 and 15 protruding from the seat 8. The slide 7 is hinged at the protruding ends of the prongs 14 and 15 to the protruding portion 6b of the support 6 by means of a screw 16 which serves a pin. The prongs 14 and 15 advantageously have end widenings 14a and 15a corresponding to the screw 1b.

The portion 6b has a thickness substantially equal to the width H of the slot and a substantially facetted periphery, with faces 17 and 18 at a right angle to each other and is provided with a suitable anti-wear material 19. The faces 17 and 18 are alternately in frontal engagement with the block 11 when the temple piece is alternately in its closed and open positions, respectively. The temple piece 2 and the front piece 3 have portions 2a and 3a which are substantially in contact when the temple piece is in open position, so that in this position the temple piece and the front piece follow each other without discontinuity.

The operation of the hinge is described here with reference to an initial position shown in FIG. 1. In this position the temple piece is in its open condition. As a result of the action of the spring 13, the temple piece is stably held in this position; as a matter of fact the elastic force of the spring 13 causes an adherent front contact of equal force between the face 18 and the block 11.

In order to bring the temple piece into the closed position it is necessary to rotate it in the direction indicated by the arrow F, exerting sufficient force to overcome the force of the spring 13. In such case the slide 7 emerges from the seat 8, against the action of the spring 13, by an amount sufficient so that the block 11 leaves the frontal contact with the face 18 and comes into frontal contact with the face 17 by passing beyond the edge between the two faces. The closed position of the temple piece, not shown in the figures, is also a stable position due to the adherent front contact with force equal to the force of the spring 13 which is established between the face 17 and the block 11.

In order to move the temple piece outward it is necessary to turn it in the direction indicated by the arrow G opposite the direction of the arrow F, applying sufficient force to overcome the force of the spring 13. In this case a point of opposing action is formed between the portions 2a and 3a of the temple piece 2 and the front piece 3 respectively and the slide 7 emerges from the seat 8 against the opposing action of the spring 13. The maximum angular displacement of the temple piece in the direction indicated by the arrow G and therefore its maximum divergence is reached when the shoulder 7b of the slide 7 enters into engagement with the block 11. Thereafter every further emergence of the slide 7 from the seat 8 is clearly prevented in the same way as there is clearly prevented any further compression of the spring 13, which never reaches the condition of fully compressed spring.

Figure 3:
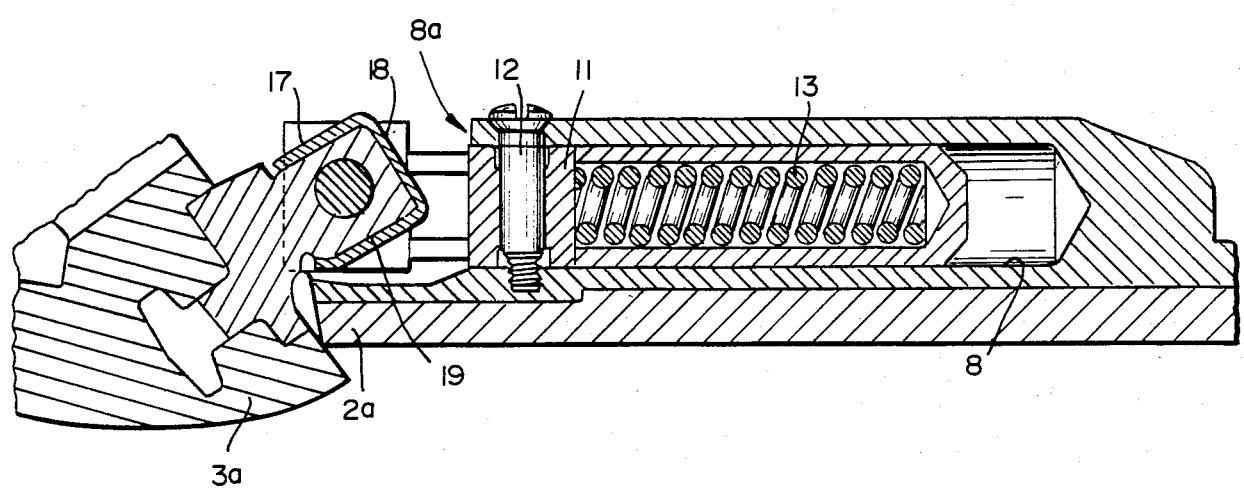
FIG. 3 is a plan view in section of a hinge in accordance with the invention with the temple piece in diverted position moved passed the open position.
Figure 4:
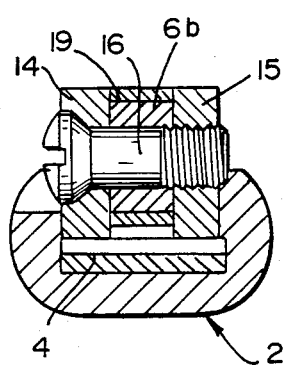
FIG. 4 is a sectional view through the hinge of FIG. 1 taken along the line 4—4.

The position of maximum divergence, shown in FIG. 3, is an unstable position; as a matter of fact, when the temple piece is let go, it is pulled back into its initial open position by the action which the spring 13 exerts on the slide 7 in the direction causing its return into the seat 8.

Due to the small number of parts which constitute the hinge of the present invention, it is of simplified manufacture and retains the advantages of easy handling of the eyeglasses even after an extremely large number of operations of opening, closing and diverging of the temple piece.

Another advantage of the hinge of the invention resides in its small overall dimensions and its lightness, they together contributing to increasing the convenience of use of eyeglasses provided with this hinge.

What is claimed is:

1. A hinge for pivoting an eyeglass temple piece divertible between a closed position against an eyeglass frame and beyond a normal open position in relation thereto, which comprises a slide, a seat provided in an end section of the temple piece, the slide being slideably mounted in the seat and having an end protruding therefrom, the slide having a hole with a bottom wall therein, the hole extending coaxially into the slide over a predetermined depth from the protruding end thereof, a slot, the slot extending longitudinally in the slide over a predetermined length from the protruding end thereof, a block, the block being mounted transversely at the mouth of the seat and extending through the slot and constituting a guide for the slide, a spring, the spring being mounted in the hole and engaging respectively the block and bottom wall of the hole, and means for hingedly connecting the protruding end of the slide to the front piece of the eyeglass frame.

2. The hinge as claimed in claim 1 wherein the slide has a rod shape.

3. The hinge as claimed in claim 2 wherein the slide is cylindrical.

4. The hinge as claimed in claim 3 wherein the slide has a circular cross section.

5. The hinge as claimed in claim 1 wherein the predetermined length of the slot is less than the predetermined depth of the hole in the slide.

6. The hinge as claimed in claim 5 wherein the slot debouches in the hole.

7. The hinge as claimed in claim 1, wherein the spring is a helical coil spring.

8. The hinge as claimed in claim 1, wherein the means for hingedly connecting the protruding end of the slide to the front piece of the eyeglass frame comprises a support having a portion embedded in the front piece and a portion protruding therefrom, the protuding portion having a facetted periphery with at least two faces substantially at right angles to each other coated with an anti-wear material, and a screw pivotably connecting the protruding end of the slide to the protruding portion of the support at right angles to the at least two faces thereof.

* * * * *